(12) United States Patent
Forsyth

(10) Patent No.: US 7,611,433 B2
(45) Date of Patent: Nov. 3, 2009

(54) DUAL CLUTCH HYBRID POWERSHIFT TRANSMISSION

(75) Inventor: John R. Forsyth, Washington, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 338 days.

(21) Appl. No.: 11/736,369

(22) Filed: Apr. 17, 2007

(65) Prior Publication Data

US 2007/0259748 A1 Nov. 8, 2007

Related U.S. Application Data

(60) Provisional application No. 60/746,513, filed on May 5, 2006.

(51) Int. Cl.
*F16H 3/72* (2006.01)
*F16H 37/06* (2006.01)
*F16H 37/02* (2006.01)
*F16H 3/08* (2006.01)

(52) U.S. Cl. .............. 475/5; 475/83; 475/215; 475/218; 74/330; 74/331; 903/910; 903/919; 180/65.6

(58) Field of Classification Search .......... 74/330, 74/331; 475/4, 5, 83, 214, 215, 218; 903/910, 903/917, 919, 951; 180/65.235, 65.6, 65.7, 180/165
See application file for complete search history.

(56) References Cited

U.S. PATENT DOCUMENTS

| 6,502,652 | B2 * | 1/2003 | Rogg | 180/65.21 |
|---|---|---|---|---|
| 7,034,481 | B2 * | 4/2006 | Imai | 318/376 |
| 7,140,461 | B2 * | 11/2006 | Morrow | 180/65.245 |
| 7,361,111 | B2 * | 4/2008 | Aitzetmueller et al. | 475/83 |
| 7,462,121 | B2 * | 12/2008 | Janson et al. | 475/5 |
| 2003/0199353 | A1 * | 10/2003 | Bowen | 475/5 |
| 2003/0217617 | A1 * | 11/2003 | Sakamoto et al. | 74/665 B |

FOREIGN PATENT DOCUMENTS

JP 2003237393 A * 8/2003

* cited by examiner

*Primary Examiner*—Tisha D Lewis
(74) *Attorney, Agent, or Firm*—Harness, Dickey & Pierce, P.L.C.

(57) ABSTRACT

A dual-clutch transmission for use in a motor vehicle having an engine and a driveline includes an output shaft adapted for connection to the driveline and a planetary gearset in constant driving engagement with the output shaft. An input shaft is driven by the engine. A first constant mesh gearset is in selective driving communication with a first member of the planetary gearset. A second constant mesh gearset is in selective driving communication with a second member of the planetary gearset. A first clutch is operable for establishing a releasable drive connection between the input shaft and the first constant mesh gearset. A second clutch is operable for establishing a releasable drive connection between the input shaft and the second constant mesh gearset. A motor is selectively drivingly coupled to a third member of the planetary gearset.

31 Claims, 3 Drawing Sheets

DUAL CLUTCH HYBRID POWERSHIFT TRANSMISSION

CROSS-REFERENCE TO RELATED APPLICATIONS

This application claims the benefit of U.S. Provisional Application No. 60/746,513, filed on May 5, 2006. The disclosure of the above application is incorporated herein by reference.

BACKGROUND

The present disclosure relates to transmissions for use in motor vehicles and, more particularly, to a dual-clutch automated hybrid transmission applicable for use in such motor vehicles.

Automobile manufacturers continuously strive to improve fuel efficiency. Efforts to improve fuel efficiency, however, are typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting may result in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

Automobile manufacturers are also actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles are equipped with an internal combustion engine and an electric motor that can be operated independently or in combination to drive the vehicle.

There are two types of hybrid vehicles, namely series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

SUMMARY

Accordingly, it may be advantageous to position the clutches of a dual-clutch transmission at opposite ends of the transmission to provide maximized cooling. Additionally, by positioning the clutches in this manner, each clutch assembly may be appropriately sized without the requirement that the shift clutch be packaged within the start clutch. Furthermore, depending on the location of the output shaft of the transmission, it may be possible to provide drive torque to front and rear propeller shafts without the use of a separate transfer case.

Additionally, the present disclosure provides a dual-clutch transmission and a control system for permitting automatic shifting of the dual-clutch transmission.

Furthermore, the dual-clutch automated transmission disclosed herein may be used as a hybrid drive system in conjunction with the internal combustion engine.

In one configuration, a dual-clutch transmission is described for use in a motor vehicle having an engine and a driveline. The transmission includes an output shaft adapted for connection to the driveline and a planetary gearset in constant driving engagement with the output shaft. An input shaft is driven by the engine. A first constant mesh gearset is in selective driving communication with a first member of the planetary gearset. A second constant mesh gearset is in selective driving communication with a second member of the planetary gearset. A first clutch is operable for establishing a releasable drive connection between the input shaft and the first constant mesh gearset. A second clutch is operable for establishing a releasable drive connection between the input shaft and the second constant mesh gearset. A motor is selectively drivingly coupled to a third member of the planetary gearset.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
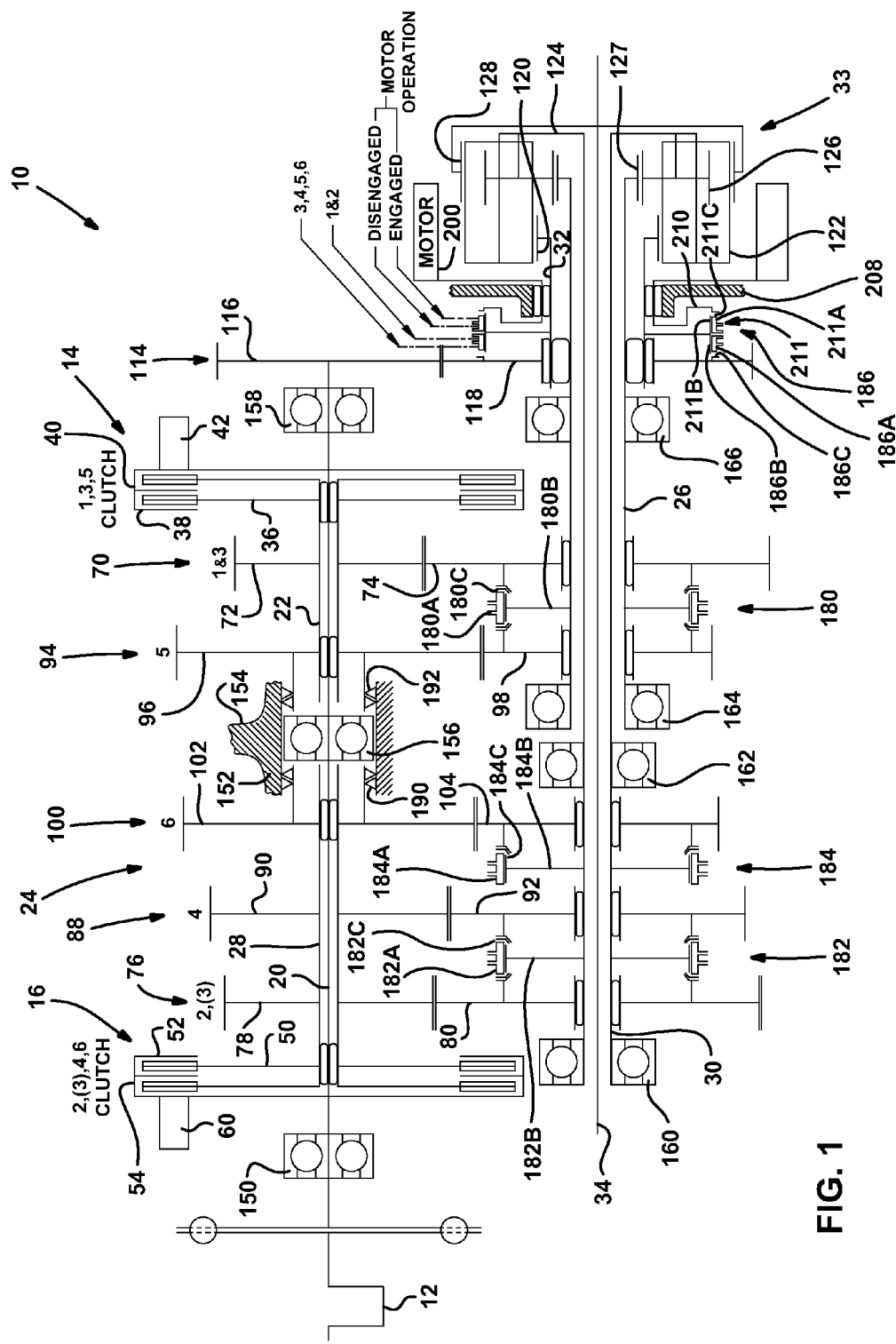
FIG. 1 is a schematic view of a dual-clutch automated transmission as described in the disclosure.

The following description is merely exemplary in nature and is not intended to limit the present disclosure, application, or uses. It should be understood that throughout the drawings, corresponding reference numerals indicate like or corresponding parts and features.

Figure 2:
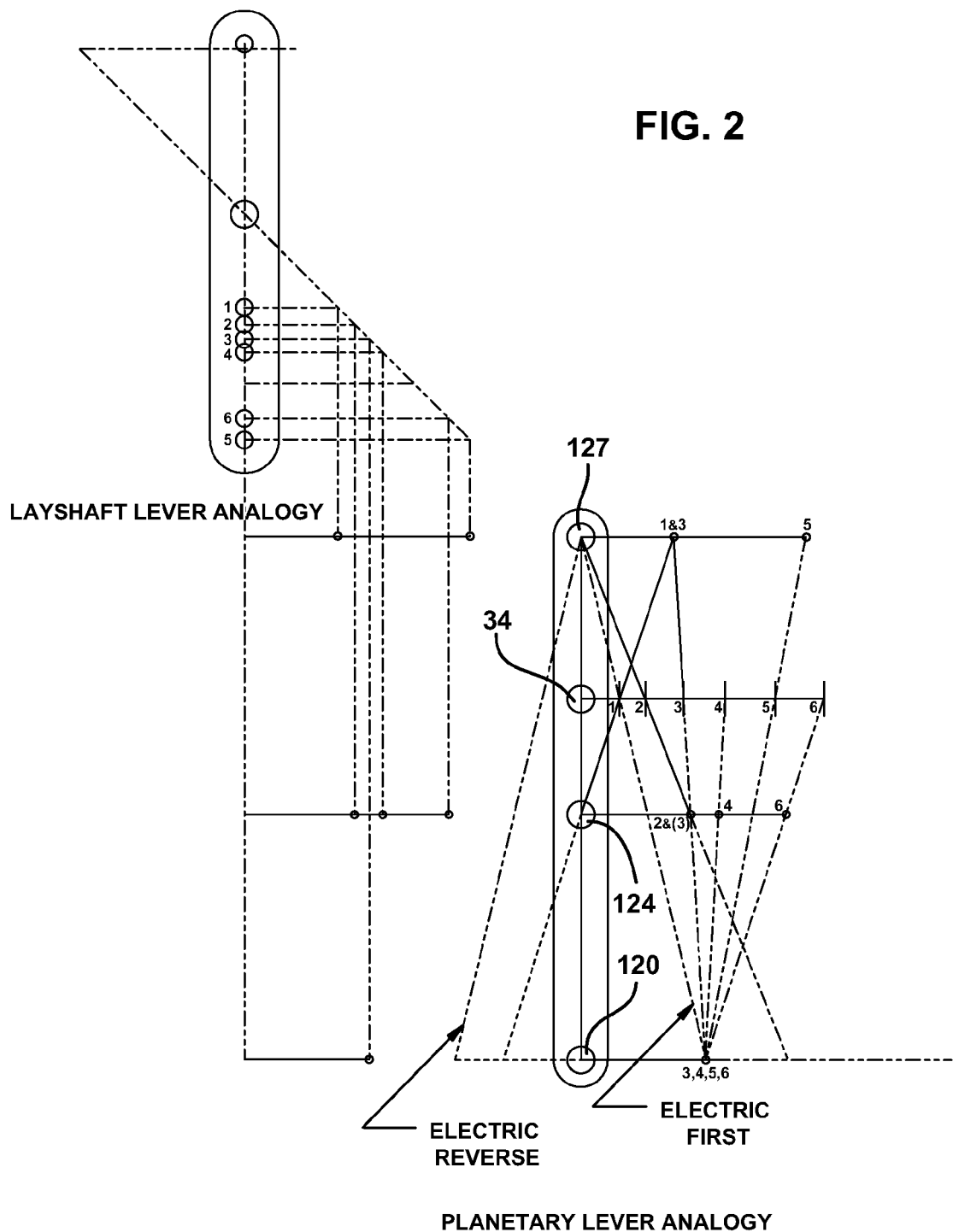
FIG. 2 is a lever diagram indicating the interconnection of various components of the dual-clutch automated transmission shown in FIG. 1.
Figure 3:
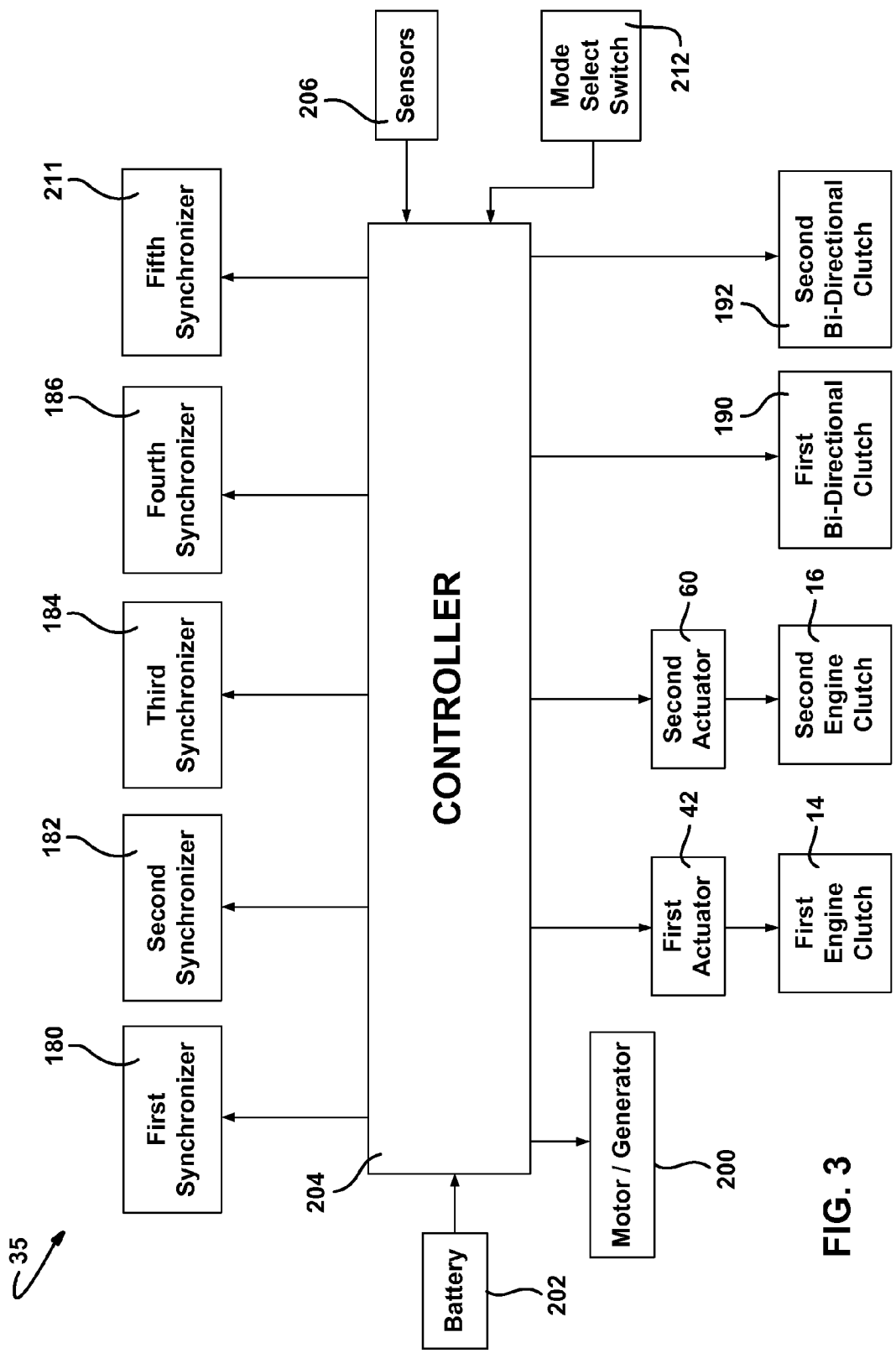
FIG. 3 is a diagrammatic illustration of the transmission control system adapted for use with the dual-clutch automated transmission shown in FIG. 1.

With reference to FIGS. 1-3 of the accompanying drawings, a dual-clutch automated transmission, hereinafter referred to as transmission 10, will now be described. Transmission 10 is driven by the output of an engine 12 and generally includes a first clutch 14, a second clutch 16, an input shaft 20, a first tubular transfer shaft 22, a plurality of output gearsets 24, a first countershaft 26, a second tubular transfer shaft 28, a second countershaft 30, a third countershaft 32, a planetary gearset 33, an output shaft 34, and a shift control system 35.

First clutch 14 is a multi-plate clutch having a plurality of inner clutch plates 36 in splined engagement with first tubular shaft 22. A plurality of outer clutch plates 38 are in splined engagement with a housing 40 fixed to input shaft 20. First clutch 14 is normally operable in an engaged or closed state to establish a drive connection between input shaft 20 and first transfer shaft 22. A first actuator 42 is provided to apply a force to cause inner clutch plates 36 and outer clutch plates 38 to separate from one another and cease the transfer of torque through first clutch 14. In the embodiment shown, first actuator 42 may be a hydraulically-actuated device that controls the magnitude of torque transferred through first clutch 14. First actuator 42 may also fully release first clutch 14 so no torque is transferred therethrough.

Second clutch 16 includes a plurality of inner clutch plates 50 in splined engagement with second transfer shaft 28 and a plurality of outer clutch plates 52 in splined engagement with a housing 54. Housing 54 is fixed to input shaft 20 at an end opposite first clutch 14. Second clutch 16 is also a normally closed clutch that transmits torque when not acted upon by an external force. In the closed condition, inner clutch plates 50 frictionally engage outer clutch plates 52 and torque is transferred between engine output 12 and second transfer shaft 28. Inner clutch plates 50 and outer clutch plates 52 are axially moveable to positions spaced apart from one another where second clutch 16 does not transfer torque. A second actuator 60 is operable to control second clutch 16 to selectively transfer a predetermined quantity of torque between input shaft 20 and second transfer shaft 28 or fully release the clutch plates from one another. While it is contemplated that first actuator 42 and second actuator 60 are hydraulically operated devices, other types of actuators including electrically-powered actuators are within the scope of the present disclosure.

The plurality of output gearsets 24 include a first and third gearset 70 having a first and third drive gear 72 fixed to first transfer shaft 22 which is meshed with a first and third speed gear 74 rotatably supported on first countershaft 26. A second gearset 76 includes a second drive gear 78 fixed to second transfer shaft 28 which is in meshed engagement with a second speed gear 80 rotatably supported on second countershaft 30. A fourth gearset 88 includes a fourth drive gear 90 fixed to second transfer shaft 28 which is in meshed engagement with a fourth speed gear 92 rotatably supported on second countershaft 30. A fifth gearset 94 includes a fifth drive gear 96 fixed to first transfer shaft 22 which is in meshed engagement with a fifth speed gear 98 rotatably supported on first countershaft 26. A sixth gearset 100 includes a sixth drive gear 102 fixed to second transfer shaft 28 which is in meshed engagement with a sixth speed gear 104 rotatably supported on second countershaft 30. A headset 114 includes a headset drive gear 116 fixed to input shaft 20 which is in meshed engagement with a headset speed gear 118 rotatably supported on third countershaft 32.

Planetary gearset 33 is depicted as a ravigneaux-type gearset having a first sun gear 120 fixed to third countershaft 32 and meshed with a first set of pinion gears 122 rotatably supported on a carrier 124. Carrier 124 is fixed to second countershaft 30. A second set of pinion gears 126 are also rotatably supported on carrier 124. A second sun gear 127 is fixed to first countershaft 26 and meshed with second set of pinion gears 126. A ring gear 128 is fixed to output shaft 34 and is in meshed engagement with first set of pinion gears 122. First set of pinion gears 122 are also meshed with second set of pinion gears 126.

To provide a robust, compact package, input shaft 20 is concentrically supported in the front bearing bulkhead portion of a housing 152 by a bearing assembly 150 (FIG. 1). Housing 152 also includes a center web 154 rotatably supporting a middle portion of input shaft 20 with a bearing assembly 156. An opposite end of input shaft 20 is rotatably supported in housing 152 by another bearing assembly 158. Second transfer shaft 28 concentrically surrounds a portion of input shaft 20 and is rotatably supported thereon. First transfer shaft 22 also concentrically surrounds a portion of input shaft 20 and is rotatably supported thereon. Second countershaft 30 concentrically surrounds output shaft 34 and is supported by bearing assemblies 160 and 162. First countershaft 26 also concentrically surrounds a portion of second countershaft 30 and is rotatably supported by bearing assemblies 164 and 166.

Output shaft 34 is drawn to include a first (left) end portion extending from housing 152 and a second (right) end portion also extending from housing 152. This graphical depiction indicates that output shaft 34 may have either of its ends connected to driveline components or even possibly both ends connected to various driveline components. If the first end portion of output shaft 34 is used as a drive connection, it is contemplated that this arrangement will be useful for front wheel drive applications. For rear-wheel drive applications, it is contemplated that the second end portion of output shaft 34 be coupled to an appropriate driveline. One skilled in the art will appreciate that these arrangements are merely exemplary and that one or both ends of output shaft 34 may be utilized to provide output torque to drivelines of a vehicle without departing from the scope of the present disclosure.

Shift control system 35 includes a plurality of electrically-actuated synchronizers which are operable for selectively coupling a selected speed gear to first countershaft 26, second countershaft 30 or third countershaft 32 for establishing the six forward and one reverse speed ratio drive connections. These electrically-actuated synchronizers include a first synchronizer 180 operable for selectively coupling/releasing first and third speed gear 74 and fifth speed gear 98 to/from first countershaft 26. A second synchronizer 182 is operable for selectively coupling/releasing second speed gear 80 and fourth speed gear 92 to/from second countershaft 30. A third synchronizer 184 is operable for selectively coupling/releasing sixth speed gear 104 to/from second countershaft 30. A fourth synchronizer 186 is operable for selectively coupling/ releasing headset speed gear 118 to/from third countershaft 32. Each synchronizer includes a sliding sleeve (denoted by the suffix "A") which is splined for rotation with and axial movement on a clutch hub (denoted by the suffix "B") which, in turn, is fixed to one of first countershaft 26, second countershaft 30 or third countershaft 32. A cone clutch assembly (denoted by suffix "C") is positioned between the sliding sleeve and an adjacent speed gear. As the synchronizer is engaged, the cone clutch assembly causes the rotational speed of the hub to match the speed gear. Once speed synchronization is complete, the sliding sleeve is allowed to engage the adjacent speed gear.

Each synchronizer may be electrically powered to control axial movement of the shift sleeves. It is to be understood that any other type of power-operated device capable of moving each sliding sleeve between its uncoupled and coupled positions is within the scope of this disclosure.

Shift control system 35 also includes a first bi-directional clutch 190 selectively operable to restrict rotation of sixth drive gear 102 by interconnecting it with housing 152. A second bi-directional clutch 192 is operatively coupled to fifth drive gear 96. Second bi-directional clutch 192 may be selectively operated to restrict fifth drive gear 96 from rotation by coupling it to housing 152. Each of the bi-directional clutches is operable to selectively allow or restrict rotation in either direction.

As shown in FIG. 3, shift control system 35 further includes a motor/generator 200 that may be selectively connected to third countershaft 32, a battery 202, a controller 204 and vehicle sensors 206. Motor/generator 200 includes a fixed stator 208 and a rotor 210 that is rotatably supported on third countershaft 32. A fifth synchronizer 211 is operable for selectively coupling/releasing rotor 210 to/from third countershaft 32. Controller 204 receives various sensor input signals from sensors 206. Controller 204 is an electronically-controlled unit capable of receiving data from the vehicle sensors and generating output signals in response to the sensor input signals. The input signals delivered to controller 204 can include, without limitation, engine speed, throttle position, brake status, input shaft speed, tubular shaft speeds, countershaft speeds, and output shaft speed. Controller 204 is operable to coordinate and monitor actuation of all the electrically-controlled devices associated with shift control system 35, so as to permit power shifted sequential gear changes automatically without any input from the vehicle operator. As such, transmission 10 is capable of being smoothly shifted automatically without power interruption.

Controller 204 also functions to control shifting of motor/generator 200 between a "drive" mode, a "regeneration" mode and a "no-load" mode. In the drive mode, the motor/generator 200 functions as an electric motor that is driven by electric power. In the regeneration mode, motor/generator 200 functions as an electric generator operable to perform regenerative braking where brake torque provided by the motor/generator generates electricity that is stored in battery 202. In the no-load mode, rotor 210 of motor/generator 200 is permitted to rotate freely.

If desired, a manually-operable mode selector switch 212 can be provided to shift transmission 10 from its automatic shift mode to a manual shift mode. Mode switch 212 would, when actuated, allow the vehicle operator to shift the gear shift lever manually to effect sequential gear shifts without the use of a clutch pedal. However, controller 204 would only permit the selective gear shift to be completed if the current vehicle characteristics (i.e., engine speed, vehicle speed, etc.) permit completion of the requested shift.

To operate the vehicle, engine 12 is started with the gear shift lever in its PARK position. Each of first clutch 14 and second clutch 16 are in the normally engaged state with their respective drive connections completed. However, each of the electrically-actuated synchronizers are released with each shift sleeve located in its neutral uncoupled position such that no drive torque is delivered to second countershaft 30. When the vehicle operator moves the gear shift lever from the PARK position to the DRIVE position, first actuator 42 is operated to place first clutch 14 in the open state. Second actuator 60 is operated to place second clutch 16 in the open state. First synchronizer 180 is actuated to drivingly interconnect first and third speed gear 74 and first countershaft 26. Second synchronizer 182 is controlled to drivingly interconnect second speed gear 80 and second countershaft 30. First bi-directional clutch 190 is actuated to restrict rotation of sixth drive gear 102. At this time, rotation of second countershaft 30 and carrier 124 of planetary gearset 33 is restricted. First actuator 42 is controlled to allow normally closed first clutch 14 to transfer torque from input shaft 20 through first clutch 14, first transfer shaft 22, first and third drive gear 72, first and third speed gear 74, first countershaft 26, second sun gear 127, planetary gearset 33 to output shaft 34 so as to establish the first forward speed ratio drive connection between the input shaft 20 and the output shaft 34. First clutch 14 is gradually engaged to smoothly accelerate the vehicle.

Thereafter, when the vehicle operating parameters indicate a need to shift into the second forward gear ratio, controller 204 outputs signals to place first bi-directional clutch 190 in an open condition and second bi-directional clutch 192 in a condition to restrict rotation of fifth drive gear 96 and second sun gear 127. Second synchronizer 182 remains energized to maintain a driving interconnection with second speed gear 80 and second countershaft 30. Controller 204 coordinates the release of first clutch 14 and the engagement of second clutch 16. As such, torque is transferred from input shaft 20, through second clutch 16, second transfer shaft 28, second drive gear 78, second speed gear 80, second countershaft 30, carrier 124, and planetary gearset 33 to output shaft 34 so as to establish the second forward speed ratio drive connection.

To automatically establish the third forward gear ratio, second bi-directional clutch 192 is placed in an open or freewheeling condition. Controller 204 signals first actuator 42 to cause inner clutch plates 36 to become engaged with outer clutch plates 38 such that torque is transferred between input shaft 20 and first transfer shaft 22. Accordingly, both first clutch 14 and second clutch 16 simultaneously transfer torque. It should be appreciated that a 2-3 power shift occurs as controller 204 controls first clutch 14 to become engaged. During third forward gear operation, both second sun gear 127 and carrier 124 are being driven.

Once first clutch 14 and second clutch 16 are fully engaged to establish the third forward gear ratio, fourth synchronizer 186 is actuated to drivingly interconnect headset speed gear 118 and third countershaft 32. Headset drive gear 116 and headset speed gear 118 define a ratio such that the rotational speed of headset speed gear 118 is equal to the rotational speed of third countershaft 32 while transmission 10 operates in the third forward gear ratio. Accordingly, it should be appreciated that fourth synchronizer 186 may simply be a dog clutch if a simple device is desired. Once headset speed gear 118 and third countershaft 32 are drivingly interconnected, second clutch 16 may be released. The remaining 3-4, 4-5 and 5-6 up-shifts may occur as clutch-to-clutch shifts while the driving interconnection between headset speed gear 118 and third countershaft 32 is maintained.

In particular, a 3-4 up-shift is accomplished by placing second clutch 16 in the open condition and actuating second synchronizer 182 to drivingly interconnect fourth speed gear 92 and second countershaft 30. A 3-4 power shift is completed by gradually disengaging first clutch 14 while second clutch 16 is gradually engaged. To prepare for a 4-5 shift, first synchronizer 180 is controlled to drivingly interconnect fifth speed gear 98 and first countershaft 26. Once controller 204 determines that a 4-5 shift should occur, second clutch 16 is gradually disengaged while first clutch 14 is gradually engaged. In the fifth forward speed ratio, power is transferred from input shaft 20 through first clutch 14, first transfer shaft 22, fifth drive gear 96, fifth speed gear 98, first countershaft 26, second sun gear 127, planetary gearset 33 to output shaft 34. Simultaneously, power is transferred from input shaft 20 through headset drive gear 116, headset speed gear 118, third countershaft 32, first sun gear 120, planetary gearset 33 to output shaft 34.

To accomplish a 5-6 up-shift, third synchronizer 184 is actuated to drivingly interconnect sixth speed gear 104 and second countershaft 30. First clutch 14 is gradually disengaged while second clutch 16 is gradually engaged to complete the clutch-to-clutch 5-6 shift.

The previous operational description relates to power being provided solely by engine 12. Other modes of operation including drive torque being supplied from electric motor/generator 200 in the drive mode are also contemplated. Specifically, the vehicle may be launched from a standstill without assistance from engine 12 if battery 202 is sufficiently charged. Transmission 10 may transfer torque output from electric motor/generator 200 while engine 12 is turned off by controlling fifth synchronizer 211 to drivingly couple rotor 210 to third countershaft 32. To produce the first forward gear ratio in the electric drive mode, second bi-directional clutch 192 is actuated to restrict fifth drive gear 96 from rotation. Additionally, first synchronizer 180 is actuated to drivingly couple fifth speed gear 98 to first countershaft 26, thereby restricting rotation of second sun gear 127. In similar fashion, a first reverse gear ratio is provided by positioning the components as previously described in relation to the electric motor first forward gear ratio but by rotating rotor 210 in the opposite direction.

To provide a maximum power output through transmission 10, engine 12 may be operated simultaneously with electric motor/generator 200. Motor/generator 200 is also operable in the regeneration mode. In this mode of operation, energy is provided from engine 12 or the kinetic energy of the moving vehicle. To charge battery 202, fifth synchronizer 211 is actuated to drivingly interconnect third countershaft 32 with rotor 210 such that rotor 210 is driven relative to stator 208 to generate electricity.

From the following description, it should be apparent that transmission 10 provides an energy efficient assembly where sequential shifts may be pre-selected thereby requiring only clutch-to-clutch switching to effect a shift. Benefits include smoother, quicker sequential shifts. The electric motor/generator creates hybrid geartrain capability while maintaining a direct mechanical torque path for non-hybrid operation. Engine off, electric motor vehicle launch is also available. Depending on the number of forward and reverse gear ratios desired, various combinations of clutches and gearsets may be configured even though not explicitly depicted in the drawings. Furthermore, the spaced apart positioning of the first and second clutches assists in cooling the clutches.

These and other variations disclose and describe merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A dual-clutch transmission for use in a motor vehicle having an engine and a driveline, comprising:
    an input shaft driven by the engine;
    an output shaft adapted for connection to the driveline;
    a planetary gearset in constant driving engagement with said output shaft;
    a first constant mesh gearset selectably connectable with a first member of said planetary gearset;
    a second constant mesh gearset selectably connectable with a second member of said planetary gearset;
    a first clutch operable for establishing a releasable drive connection between said input shaft and said first constant mesh gearset;
    a second clutch operable for establishing a releasable drive connection between said input shaft and said second constant mesh gearset; and
    an electric motor selectively drivingly coupled to a third member of said planetary gearset.

2. The dual-clutch transmission of claim 1 wherein said planetary gearset is a compound planetary gearset, and wherein said output shaft is fixed to a fourth member of said compound planetary gearset.

3. The dual-clutch transmission of claim 2 wherein a first forward drive ratio is provided when a first torque path through said first clutch is established, wherein a second forward drive ratio is provided when a second torque path through said second clutch is established, and wherein a third forward drive ratio is provided when both the first and second torque paths are established.

4. The dual-clutch transmission of claim 1 further including a third constant mesh gearset driven by said input shaft and a gearset clutch operable to releasably couple said third constant mesh gearset to said third member of said planetary gearset.

5. The dual-clutch transmission of claim 1 further including a first device operable to restrict rotation of said first member of said planetary gearset.

6. The dual-clutch transmission of claim 1 wherein a gear associated with said first constant mesh gearset is rotatably supported on a first countershaft that surrounds a portion of said output shaft.

7. A dual-clutch transmission for use in a motor vehicle having an engine and a driveline comprising:
    an input shaft driven by the engine;
    an output shaft adapted for connection to the driveline;
    a planetary gearset in constant driving engagement with said output shaft;
    a first countershaft fixed to a first member of said planetary gearset;
    a second countershaft fixed to a second member of said planetary gearset;
    a first engine clutch operable for establishing a releasable drive connection between said input shaft and a first transfer shaft;
    a second engine clutch operable for establishing a releasable drive connection between said input shaft and a second transfer shaft;
    a first constant mesh gearset driven by said first transfer shaft;
    a second constant mesh gearset driven by said second transfer shaft;
    first and second shift clutches, said first shift clutch operable to releasably drivingly couple said first gearset to said first countershaft, and said second shift clutch operable to releasably drivingly couple said second gearset to said second countershaft; and a motor selectively drivingly coupled to a third member of said planetary gearset.

8. The dual-clutch transmission of claim 7 further comprising a third constant mesh gearset driven by said second transfer shaft and a fourth constant mesh gearset driven by said first transfer shaft.

9. The dual-clutch transmission of claim 8 wherein said first shift clutch is operable to releasably couple said fourth gearset and said first countershaft, and wherein said second shift clutch is operable to releasably couple said third gearset and said second countershaft.

10. The dual-clutch transmission of claim 9 further including a fifth shift driven by said second transfer shaft.

11. The dual-clutch transmission of claim 10 further including a third shift clutch operable to releasably couple said fifth gearset to said second countershaft.

12. The dual-clutch transmission of claim 7 further including a controller for controlling actuation of said first and second engine clutches.

13. The dual-clutch transmission of claim 12 further including first and second actuators controlling said first and second engine clutches, respectively, said controller controlling actuation of said first and second actuators.

14. The dual-clutch transmission of claim 13 wherein said first and second shift clutches are electrically-actuated synchronizer clutches.

15. The dual-clutch transmission of claim 7 wherein said first transfer shaft surrounds a portion of said input shaft.

16. The dual-clutch transmission of claim 15 wherein said second transfer shaft surrounds another portion of said input shaft.

17. The dual-clutch transmission of claim 7 wherein said first and second constant mesh gearsets are axially positioned between said first engine clutch and said second engine clutch.

18. The dual-clutch transmission of claim 7 wherein said first and second engine clutches are normally closed clutches operable to transmit torque without an application of external force.

19. The dual-clutch transmission of claim 7 further including a third constant mesh gearset driven by said input shaft and a third shift clutch operable to releasably couple said third constant mesh gearset to said third member of said planetary gearset.

20. The dual-clutch transmission of claim 7 wherein said planetary gearset is a ravigneaux-type gearset.

21. The dual-clutch transmission of claim 20 wherein said output shaft is fixed to a fourth member of said planetary gearset.

22. The dual-clutch transmission of claim 7 further including a first device operable to restrict rotation of said first member of said planetary gearset.

23. The dual-clutch transmission of claim 22 further including a second device operable to restrict rotation of said second member of said planetary gearset.

24. A dual-clutch transmission for use in a motor vehicle having an engine and a driveline comprising:
an input shaft being driven by the engine;
an output shaft adapted for connection to the driveline;
a planetary gearset in constant driving engagement with said output shaft;
a first clutch operable for establishing a releasable drive connection between said input shaft and a first transfer shaft;
a second clutch operable for establishing a releasable drive connection between said input shaft and a second transfer shaft;
a first constant mesh gearset driven by said first transfer shaft;
a second constant mesh gearset driven by said second transfer shaft;
first and second gearset clutches, said first gearset clutch operable to releasably drivingly couple said first gearset to a first member of said planetary gearset, said second gearset clutch operable to releasably drivingly couple said second gearset to a second member of said planetary gearset; and
a motor selectively drivingly coupled to a third member of said planetary gearset.

25. The dual-clutch transmission of claim 24 wherein said planetary gearset is a compound planetary gearset, said output shaft is fixed to a fourth member of said compound planetary gearset.

26. The dual-clutch transmission of claim 25 further including a third constant mesh gearset driven by said input shaft and a third gearset clutch operable to releasably drivingly couple said third constant mesh gearset to said third member of said planetary gearset.

27. The dual-clutch transmission of claim 26 wherein said third gearset clutch is operable to selectively drivingly couple said motor to said third member of said planetary gearset.

28. The dual-clutch transmission of claim 24 wherein a first forward drive ratio is established when a first torque path including said first clutch is completed, a second forward drive ratio is established when a second torque path including said second clutch is completed, and a third forward drive ratio is established when both said first and second torque paths are completed.

29. The dual-clutch transmission of claim 28 wherein during operation in said first forward drive ratio said second member of said planetary gearset is restricted from rotation.

30. The dual-clutch transmission of claim 29 wherein during operation in said the second forward drive ratio said first member of said planetary gearset is restricted from rotation.

31. The dual-clutch transmission of claim 30 wherein during operation in said third forward drive ratio both of said first and second members of said planetary gearset are free to rotate.

* * * * *